United States Patent
Duvaut et al.

(10) Patent No.: US 6,744,824 B1
(45) Date of Patent: Jun. 1, 2004

(54) MULTIPLE ACCESS METHOD, DEVICES FOR PERFORMING THIS METHOD AND COMMUNICATIONS SYSTEMS USING THESE METHODS

(75) Inventors: Patrick Duvaut, Pontoise (FR); Thierry Jesupret, Brussels (BE); Marc Marie Ghislain Durvaux, Montigny-Le Tilleul (BE)

(73) Assignee: Alcatel, Paris (FR)

( * ) Notice: Subject to any disclaimer, the term of this patent is extended or adjusted under 35 U.S.C. 154(b) by 686 days.

(21) Appl. No.: 09/704,680

(22) Filed: Nov. 3, 2000

(Under 37 CFR 1.47)

(30) Foreign Application Priority Data

Nov. 5, 1999 (EP) ............................................. 99402766

(51) Int. Cl.[7] .......................... H04K 1/02; H04L 25/03; H04L 25/49
(52) U.S. Cl. ....................................... 375/296; 375/350
(58) Field of Search ................................. 375/259, 295, 375/296, 316, 350, 219, 324, 340; 370/480, 489, 210

(56) References Cited

U.S. PATENT DOCUMENTS

| | | | |
|---|---|---|---|
| 4,759,013 A | * 7/1988 | Ichiyoshi | ..................... 370/307 |
| 5,099,493 A | 3/1992 | Zeger et al. | |
| 5,177,768 A | 1/1993 | Crespo et al. | |
| 5,299,192 A | * 3/1994 | Guo et al. | ................... 370/210 |
| 5,999,575 A | * 12/1999 | Tanaka et al. | ............... 375/329 |
| 6,218,896 B1 | * 4/2001 | Becker et al. | ............... 329/304 |
| 6,285,720 B1 | * 9/2001 | Martone | ..................... 375/262 |
| 6,317,409 B1 | * 11/2001 | Murakami | ................... 370/203 |
| 6,452,982 B1 | * 9/2002 | O'Dell et al. | ................ 375/316 |

OTHER PUBLICATIONS

Akansu, A. N. et al.: "A New Look at Digital Orthogonal Transmultiplexers for CDMA Communications" IEEE Transactions on Signal Processing, US, IEEE, Inc., New York, vol. 45, No. 1, Jan. 1, 1997, pp. 263–267, XP000656790.

* cited by examiner

*Primary Examiner*—Phoung Phu
(74) *Attorney, Agent, or Firm*—Sughrue Mion, PLLC

(57) ABSTRACT

A multiple access method for use in a point to multipoint communications network includes a step of allocating a respective unique variable ($\rho 1, \ldots, \rho i, \ldots, \rho n$) to each respective network terminal of this communications network, a first all-pass filtering operation on at least one oversampled symbol which is derived from upstream information to be transmitted by a terminal (T1;Ti) to a central station (CS) of said communications network, a next step of filtering a received oversampled symbol stream at said central station (CS) for enabling said central station to discriminate therefrom said at least one oversampled symbol that was earlier transmitted by said network terminal (T1;Ti) to said central station (CS), said all-pass filtering operation having a z-transform transfer function ($\bar{c}_i(z)$) such that the zeroes thereof correspond to said respective unique variables assigned to all other network terminals, except the unique variable ($\rho 1; \rho i$) assigned to said network terminal (T1;Ti), whereby said next step of filtering consists of performing the z-transform on said received oversampled symbol stream, and of evaluating said z-transform at the unique variable ($\rho 1; \rho i$) assigned to said network terminal (T1;Ti). A transmitter and receiver for performing this method are as well disclosed.

14 Claims, 3 Drawing Sheets

MULTIPLE ACCESS METHOD, DEVICES FOR PERFORMING THIS METHOD AND COMMUNICATIONS SYSTEMS USING THESE METHODS

BACKGROUND OF THE INVENTION

The present invention relates to a multiple access method, to a transmitter and a receiver adapted to perform such a multiple access method.

Such a multiple access method, as well as a transmitter and a receiver adapted to perform such a method are already known in the art, e.g. from the article "A New Look at Digital Orthogonal Transmultiplexers for CDMA Communications", by A. N. Akansu, M. V. Tazebay and R. A. Haddad, IEEE Trans. On Signal Processing, Vol 45, Nr1, January 1997. In FIG. 1b of that article, a code division multiple access, hereafter abbreviated with CDMA, transmitters and receiver are shown. Within a CDMA communications system each user network terminal is assigned a unique code to enable the central station which is coupled to it in a point to multipoint way, to discriminate the data from each of these network terminals on the basis of this unique code. Before upstream transmission of data by a network terminal, this code is multiplied with the oversampled data symbols by means of a sign change, which operation can be considered as equivalent to a discrete time filtering of this oversampled symbol with a filter having this code as its impulse response. In the receiver depicted in the prior art, a plurality of receive filters are present, whereby each of them is linked with a respective user network terminal, after which the signal is undersampled again.

Remark that throughout this whole document oversampling is to be considered as an operation on a discrete waveform, inserting a predetermined number of zeroes between two successive values of this discrete waveform.

The CDMA method has proven to be an efficient multiple access flat spectrum technique. However it looses efficiency when the users are not synchronous. Moreover when the communication channels are dispersive the ability to discriminate between several users vanishes.

SUMMARY OF THE INVENTION

An object of the present invention is to therefore provide a multiple access method, as well as a transmitter and receiver of the above known type but wherein the aforementioned problems of loss of orthogonality in the presence of dispersive channels or non-synchronous users, are solved, while still keeping the advantage of the flat spectrum.

According to the invention, this object is achieved by a multiple access method for use in a communications network wherein a central station is coupled to a plurality of network terminals in a point to multipoint way via the cascade connection of a common link and respective individual network terminal links, the method including a step of allocating a respective unique variable to each respective network terminal of the plurality, the method including a first filtering operation on at least one oversampled symbol which is derived from upstream information to be transmitted by a terminal of the plurality to the central station, the method including a next step of filtering a received oversampled symbol stream at the central station for enabling the central station to discriminate therefrom the at least one oversampled symbol that was earlier transmitted by the network terminal to the central station (CS), wherein the first filtering operation comprises an all-pass filtering operation of said at least one oversampled symbol, the all-pass filtering operation having a z-transform transfer function $(\overline{c}_i(z))$ such that the zeroes thereof correspond to the respective unique variables assigned to all other network terminals, except the unique variable assigned to the network terminal, the next step of filtering comprises performing the z-transform on the received oversampled symbol stream, and of evaluating said z-transform at the unique variable $(\rho 1; \rho i)$ assigned to network terminal.

The object of the invention is further achieved by a transmitter for use in a network terminal of the type described above, the transmitter including a first filter adapted to perform a first filtering operation on at least one oversampled symbol which is derived from upstream information to be transmitted by said network terminal, wherein the first filter comprises an all-pass filter, of which the zeroes of the z-transform transfer function comprise all of said respective unique variables, except the unique variable $(\rho 1; \rho i)$ assigned to the network terminal.

The object of the invention is still further achieved by a receiver for use in a central station, the receiver includes second filter means (Z) adapted to perform a filter operation on a received oversampled symbol stream at said central station for enabling the central station to discriminate which part of the received oversampled symbol stream was previously transmitted by a network terminal of the plurality, wherein the second filter means (Z) comprises a z-transform means, adapted to perform the z-transform on the received oversampled symbol stream, and to evaluate the z-transform in the respective unique variable assigned to the network terminal.

In this way, as will be proven more into depth in the descriptive part of this document, by working now in the z-domain using all-pass filters for transmission, and by directly performing a z-transform in the receiver, whereby the zeros of these filters correspond to the discriminative variables of the user terminals, it is possible in the receiver to recover the original data stream transmitted by a particular user while nulling the contributions of all the others even in the presence of non-synchronous users and dispersive channels Moreover due to the all pass filter characteristics of the transmitter, a flat spectrum is preserved.

Another characteristic feature of the invention is that at least one respective unique variable assigned to at least one network terminal of the plurality comprises a plurality of unique variables assigned to the at least one network terminal, the zero factor $(z-\rho 1)$ of the z-transform of the first filtering operation performed in all other network terminals and which has as zero the at least one respective unique variable of the at least one network terminal, thereby comprising a plurality of zero factors, with the plurality of unique variables as zeroes, whereby at the central station the z-transform is evaluated at each unique variable of the plurality assigned to at least one network terminal.

A still further feature of the invention is that the z-transform means in the receiver is further adapted to evaluate the z-transform at each unique variable of the plurality assigned to the network terminal (T1).

By this the robustness with respect to the noise is even increased. Indeed, by the assignment of a plurality of zeroess in stead of only one, averaging over several received signals transmitted by the same user is possible, thereby increasing the signal to noise ratio.

The present invention also relates to a network terminal and a central station which include a transmitter and a receiver of the type described above, and to a communications network wherein the aforementioned method is applied.

An additional characteristic feature of the present invention is that the method may include an additional step of measuring a channel parameter of the communication channel between the at least one network terminal and the central station, wherein the plurality of unique variables assigned to the at least one network terminal are thereby derived from the channel parameter. The communications network according to the invention may include a device adapted to measure this channel parameter. This allows to compensate for the frequency or phase shifts in the communications channel, for instance due to the Doppler effect, as this parameter can be measured and will be used for determining the plurality of zeroes assigned to at least one terminal. By communicating the thus determined zeroes to the plurality of terminals and to the receiver, and by performing these steps at regular instances, a dynamic assignment of zeros, allowing for a dynamic multiple access mechanism, is even obtainable.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
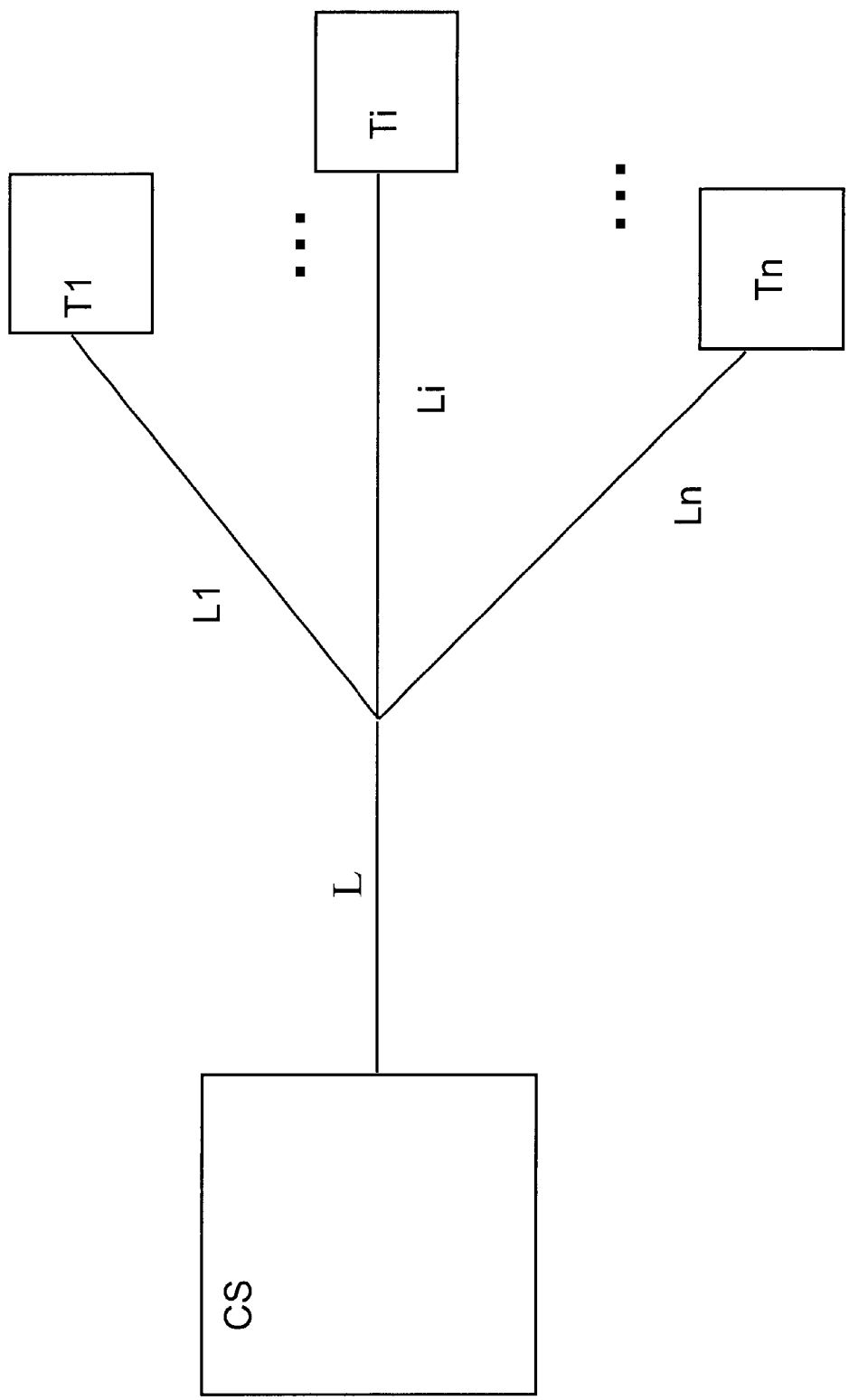
FIG. 1 schematically represents a point to multipoint communications network wherein the present method is applicable, FIG. 2 schematically represents network terminal Ti of FIG. 1 which includes a transmitter TXi according to the invention, FIG. 3 schematically represents the central station CS of FIG. 1 which includes a receiver RX according to the invention

The communications network of FIG. 1 is composed of a central station CS and a first plurality of network terminals T1, ..., Ti, ... to Tn. The central station is coupled to these network terminals via the cascade connection of a common transmission link denoted L and for instance consisting of a copper link for a power line communications, abbreviated with PLC, network, and respective individual network terminal links L1, ..., Li, ..., Ln, also for instance consisting of copper cables in the case of the aforementioned PLC network. In other environments, for instance in UMTS networks, which stands for Universal Mobile Telephony Services networks, the common transmission and individual channels consist of radio links. This is also true for satellite networks. The communications network hence has a point-to-multipoint architecture in the downstream direction, which is the direction from the central station CS to the network terminals T1 to Tn, and a multipoint-to-point architecture in the upstream direction, i.e. the direction from the network terminals T1 to Tn towards the central station CS.

Networks having such a point-to-multipoint architecture in the downstream direction are for instance the already mentioned PLC, UMTS networks and satellite networks.

In the upstream direction direction, the network terminals T1 to Tn commonly share the common transmission link L in a multiplexed way. In nowadays networks this multiplexing consists for instance of multiplexing in the time domain, called TDMA which stands for time domain multiple access and meaning that different network terminals transmit information to the central station CS in different timeslots. This method is currently used in for instance the asynchronous passive optical network, abbreviated with APON, and in GSM networks. In this method timeslots are allocated to the individual user network terminals. Another multiple access method, called orthogonal frequency division multiplexing, consists of allocating specific frequencies or frequency sub-bands of the total frequency spectrum of the common channel to the individual network terminals. Yet another multiple access method consists of the code division multiple access, hereafter abbreviated with CDMA, which is presently used in the aforementioned UMTS and satellite networks. When using this method, the entire frequency band of the common channel is shared by the multitude of network terminals by coding the information such that transmitter and receiver can only discriminate the transmitted and received data on the basis of the code. The use of orthogonal codes thereby in theory allows for a perfect discrimination amongst the different users. As is however also well known in the art, even using these orthogonal codes does not always guarantee a perfect synchronisation, especially in the presence of Doppler effect, terminal interference etc., where data coded differently is corrupted and misinterpreted as originating from another terminal.

In the subject multiple access method, which is called phase division multiple access, and abbreviated with φDMA or PHIDMA, a distinct and unique variable is allocated to each network terminal, being similar to the CDMA method. Contrary to the CDMA method in which this variable consists of a unique code, for coding the symbols, this unique variable consists of a complex number or vector in the z-plane for the PHIDMA. In CDMA the code is used for encoding the to be transmitted symbols, whereby this complete operation can be considered as an oversampling followed by a filter, which finite impulse response is equal to the code. In PHIDMA the complex vector assigned to each terminal is to be understood as a complex zero of an all-pass filter, whereby all active network terminals perform such an all-pass filtering operation using all the zero's of all other terminals, except their own. This means that for instance in terminal Ti, to which the complex variable ρi is assigned, an all-pass filter function having the following transfer function $\bar{c}_i(z)$ is performed $$\bar{c}_i(z) = C_i \frac{(1-\rho_1 z^{-1}) \ldots (1-\rho_{i-1}z^{-1})(1-\rho_{i+1}z^{-1}) \ldots (1-\rho_n z^{-1})}{(1-\rho_1^{-1*}z^{-1}) \ldots (1-\rho_{i-1}^{-1*}z^{-1})(1-\rho_{i+1}^{-1*}z^{-1}) \ldots (1-\rho_n^{-1*}z^{-1})} \quad (1)$$

Which may, in an abbreviated form, be also written as:

$$\bar{c}_i(z) = C_i \prod_{\alpha \neq i}^{n} \frac{(1-\rho_\alpha z^{-1})}{(1-\rho_\alpha^{-1*}z^{-1})} \quad (2)$$

Whereby $\rho_1, \rho_{i-1}, \rho_i, \rho_{i+1}, \rho_n$
$\rho_1^{-1*}, \rho_{i-1}^{-1*}, \rho_i^{-1*}, \rho_{i+1}^{-1*}, \rho_n^{-1*}$
respectively denote the unique complex variables and the complex conjugate of their inverse value, which are assigned to respective network terminals $T1, \ldots, Ti-1$, $Ti$, $Ti+1, \ldots, Tn$ of the communication system,
and $C_i$ is a normalisation parameter As is well known by a person skilled in the art, the poles of an all-pass filter are the complex conjugates of the inverse values of the zeroes of this all-pass filter, per definition of an all-pass filter. Thus knowing the zero's implicitely reveals the knowledge of the poles such that the complete transfer function in the z-plane is known. The zeroes are lying outside the unity circle, being the circle with radius one, in the z-plane, in order to ensure that the complex conjugates of their inverse values, being the poles of the all-pass filter, lie within this unity circle, guaranteeing the stability of such a filter operation.

The assignment of the respective unique variables to the respective terminals of the communication system is usually performed by the system administrator or manager having a complete knowledge of the complete communications network. A possible method can consist of selecting these zeroes as equidistant points in the complex z-plane on a circle with radius 2, thus by dividing the circumference by n and selecting the thus obtained vectors for attribution. These then are stored within the network terminals as well as within the central station. Of course there are numerous other ways of selecting n complex number within the z-plane outside the unity-radius circle. The modulus of the selected zero however directly influences the length of the response, the peak to average ratio of the signal and to signal to interference plus noise ratio after demodulation.

Figure 2:
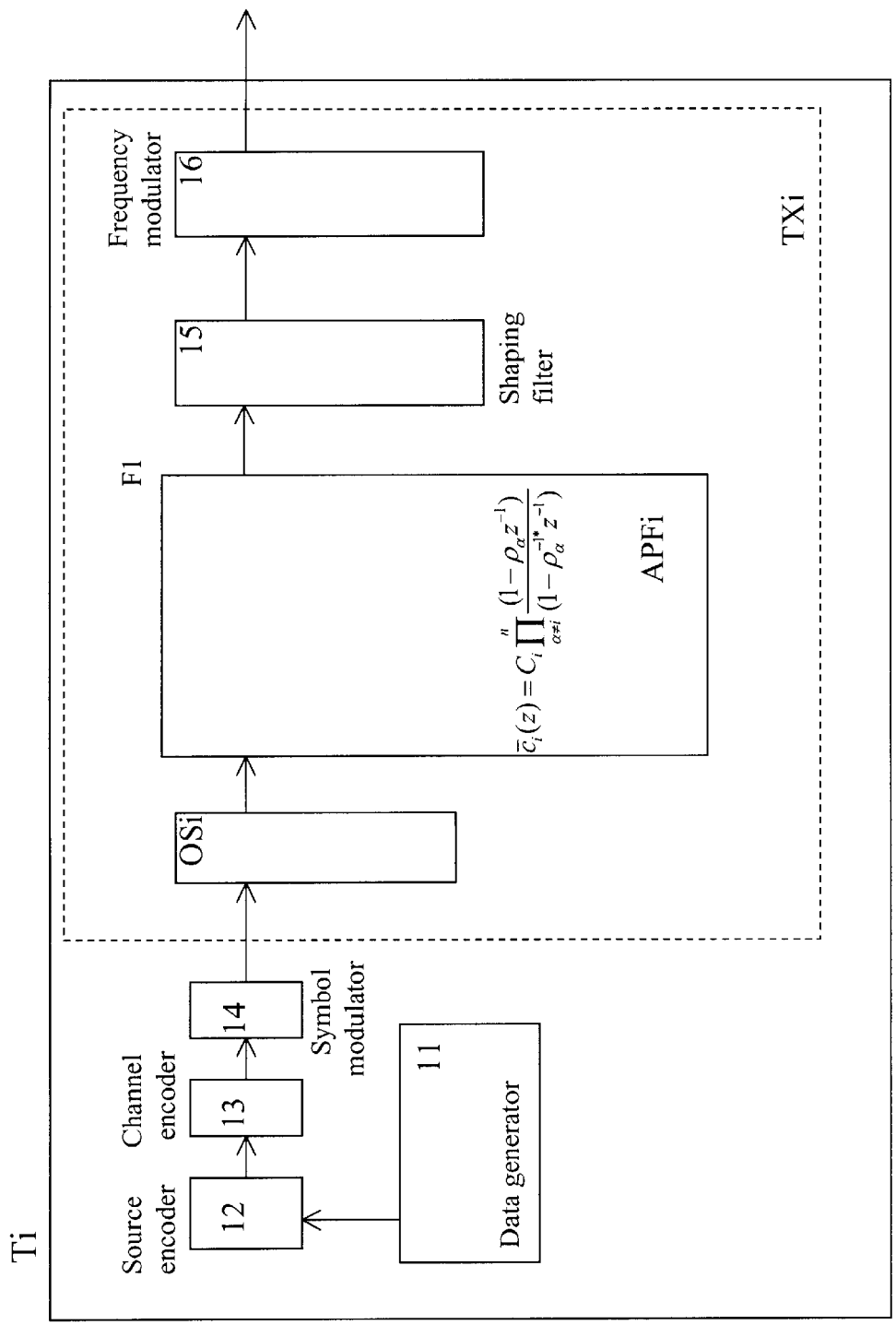

This all-pass filtering step is performed within a transmitter included in each network terminal, for instance network terminal Ti which is schematically depicted in FIG. 2. In this figure all different blocks which may be necessary for the transmission of messages generated by a data generator 11 to the central station via the communications channel consisting of the cascade connection of individual link and the common link, are indicated. Dependent on the specific properties of the medium constituting this communication channel, and on specific chosen modulation schemes for transmission across this medium, some modules will not be present in some variant embodiments of these terminals. They will however be included and described for completeness.

The data generator 11 in general generates messages each containing several symbols. These will be converted into a binary flow by means of the source encoder 12, which will subsequently deliver them to the channel encoder 13. The latter device can add additional bits per message for instance for error control coding. For applications whereby the data generator 11 directly generates a binary flow and where error control coding is not performed, both modules 12 and 13 are thus not present in the network terminals. This binary flow is converted to a new symbol flow by the symbol modulator or mapper 14 which assigns one of a predetermined set of symbols to successive sets of bits. The symbol flow then enters the transmitter TXi which is adapted to transform this symbol flow into an electrical signal which has the proper characteristics for transmission over the communication channel. To this purpose the symbol flow first undergoes an oversampling which is throughout this document to be considered as a process of adding adding zeroes between successive values of the symbols, the period between successive zeroes thereby corresponding oversampling period which is the inverse of the oversampling frequency. The resulting oversampled symbol flow can then be considered as a succession of separate and successive Dirac impulse trains, separated from each other by the symbol period, and multiplied with the value of the symbol itself at this particular moment in time. The oversampling operation, which is performed in oversampler unit OSi, is then followed by a filtering step within a first filter APFi, being the aforementioned all-pass filter with a z-transform given by formula (2). This operation is followed by the transmit or shaping filter 15 which transforms the digital oversampled and filtered symbol stream into an analog baseband electrical signal. Depending on the specific properties of the communication channel this analog baseband electrical signal may be further modulated to higher frequencies by means of frequency modulator 16. For some transmission channels this is however not needed.

The first filter APFi included within the transmitter TXi of a PHIDMA communications system thus consists of an all-pass filter APFi, which performs the already mentioned all-pass filtering step for this specific terminal, thus having the transfer function of equation (2).

It is important to remark that this all-pass filtering is performed at the oversampled symbol flow which has thus a much higher rate than the original symbol flow. This filtering step is repeated at each arrival of a new oversampled symbol, thus at the original symbol period. The input signal for each of these successive filtering operations consists of a succession of Dirac impulses at the oversampled frequency, multiplied with the respective symbol value at that particular instance in time.

The realisation of such an all-pass filter with a known tranfer function in the z-plane may for instance be realised by means of a digital signal processor, hereafter abbreviated with DSP, or by other techniques which are for instance described the handbook "Digital Filters and Signal Processing", By L. B. Jackson, Kluwer Academic Publisher.

The thus generated output symbol stream is subsequently transmitted by this all-pass filter to the shaping filter 15 after which an eventual RF or frequency modulation may be performed by module 16.

At the receiver RX in the central station CS, in principle the inverse processing steps are to be performed. This means performing a frequency demodulation in case there was a frequency modulation at the transmitter side, and which is performed by frequency demodulator 26. The electrical baseband signal is then again transformed to a symbol stream, still at the oversampled rate, by means of the matched filter 25 which further delivers the symbols to a second filter Z. In the CDMA case this second filter consisted of a filter bank with as many individual filters as there are network terminals in the communication system, whereby each filter of the filter bank performs the multiplication of the received signal with the code attributed to the specific network terminal. This operation is followed in CDMA by the undersampling of the digital data stream, performed within module US. In case of orthogonal codes and of a completely synchronised communication system, each filter combined with an undersampling unit thereby retrieves the original data transmitted by the specific network terminal to which it is assigned. In the presence of dispersive channels however, where this perfect synchronisation is not obtained, the discrimination of the individual network terminal data from the composite signal is not guaranteed.

For the PHIDMA system however the second filter of the receiver at the central station is adapted to perform the z-transform, each time a new oversampled symbol stream arrives at the second filter, on this received oversampled symbol stream. It furthermore has to evaluate this z-transform at the specific zero's that were assigned to the different individual network terminals. In an embodiment this second filter Z thereby consists of n individual filter modules for performing the z-transform, whereby n equals the amount of network terminals coupled to the central station. Each of these filters Z1 to Zn thereby performs this z-transformation at the specific zero attrituted to the associated network terminal T1 to Tn. As will be mathematically proven in a next paragraph of this document, each filter, for instance filter Zi, thereby obtains at its output the original symbol stream that was previously generated by symbol modulation unit 14 of terminal Ti, however at the oversampled rate. The rate of this oversampled symbol stream is brought back to its original rate by means of the associated undersampler USi included in oversampler US. Next demapping or symbol demodulation, channel and eventual source decoding operations, are performed by respective symbol demodulator 24, channel decoder 23 and source decoder 22. In the embodiment depicted in FIG. 3 the demapper 24 consists of n individual demappers 241 to 24n; the channel decoder 23 consists of n individual decoders denoted 231, ..., 23i, ..., 23n, and source decoder 22 consists of n individual decoders denoted 221, ..., 22i, ..., 22n.

It will now be proven mathematically that this PHIDMA technique in a very simple way cancels the contribution of the other terminals within the receiver.

Each time a new symbol arrives at the input of transmitter TXi, it is oversampled within OSi, thus resulting in a Dirac impulse multiplied with the original symbol value $a_i[k]$ at a certain moment k. The z-transform of such a Dirac impulse multiplied with a constant, equals this constant $a_i[k]$. This is the z-transform of the signal entering the all-pass filter APFi. As is well known, such a filtering operation will result in an output signal, of which the z-transform, denoted $\bar{x}_i(z)$, is given as the product of the filter transfer function $\bar{c}_i(z)$, and the filter input signal in the z-domain, resulting in the following equation:

$$\bar{x}_i(z) = \bar{c}_i(z) a_i[k] \quad (3).$$

This is the z-transform of the signal leaving the all-pass filter APFi of FIG. 2, whereby this all-pass filter has the transfer function such as described by equation (2).

Figure 3:
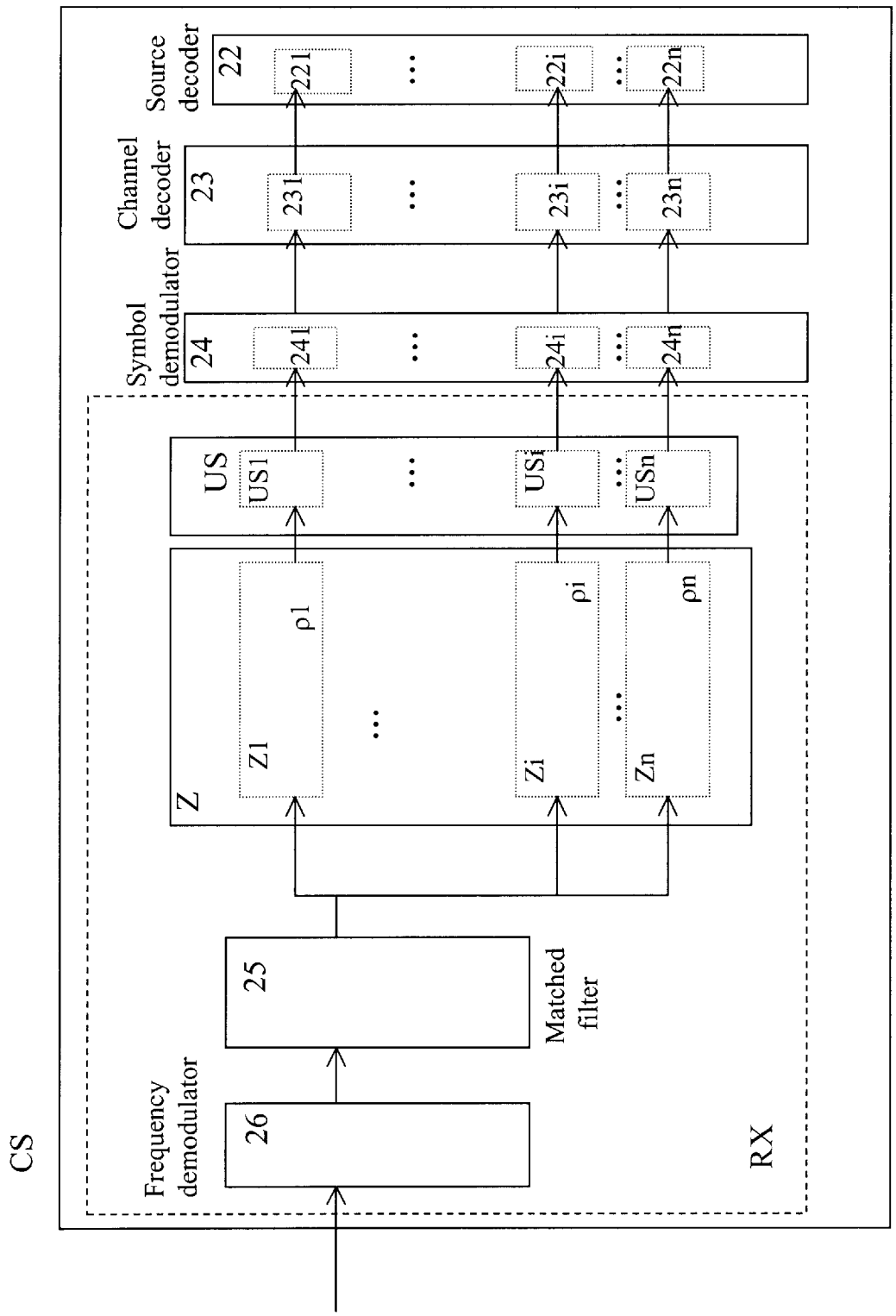

If we denote with $\bar{g}_i(z)$ the transfer function of the total of the shaping filter, the individual communication channel Li, the common link, and the matched filter of FIG. 3, we can state that the z-transform of the signal which originated at terminal Ti and which arrives at the input of the receiver 24 is given by (3).

The z-transform of the complete signal arriving at the input of the receiver 24 is the sum of all z-transforms of all contributions of all terminals T1 to Tn because of the linear feature of the z-transform and because of the first order assumption generally accepted in the art that there is no influence of one terminal on the transmission of the others. The z-transform of the signal $\bar{r}(z)$ arriving at the input of Z of FIG. 3 is thus given by $$\bar{r}(z) = \sum_{i=1}^{n} a_i[k] \bar{c}_i(z) \bar{g}_i(z) + \bar{w}(z) \quad (4)$$

whereby $\bar{g}_i(z)$ denotes the z-transform of the total of the shaping filter, the individual communications channel Li, the common link and the match filter of any arbitrary terminal Ti. This function may determined by the communications system during for instance a learning phase.

$\bar{w}(z)$ denotes the z-transform of the noise, being a stochastic function of z.

The function of Z is merely to perform this z-transform at the received symbol flow arriving at Z, and to evaluate this in the different zero's. This means that in, for instance Zi, where (4) is evaluated in $\rho_i$, the result of this evaluation is given by $$a_1[k]\bar{c}_i(\rho_i)\bar{g}_i(\rho_i) + \bar{w}(\rho_i) \quad (5)$$

since $\bar{c}_i(\rho_i)$ as well as $\bar{g}_i(\rho_i)$ are known, and since, at a first approximation, contribution of the noise is assumed to be neglectable, the original value $\bar{a}_i[k]$ of the symbol can be recovered within Zi as apparent from (5).

It is important to remark that the time between two successive values of the symbol flow of any terminal in the communications system, has to be larger than the maximum delay of the transmission between any terminal and the central station. Successive symbols of one terminal may not enter the filter Z whereas the latter is still busy discriminating amongst the received symbols transmitted during a predetermined time interval, for instance between k+1 and k.

In a further improvement of the method, the unique variable, for instance variable ρ1 assigned to a particular network terminal, for instance T1, consists of a plurality of unique variables, denoted (ρ11, ..., ρ1j, ... ρ1m). Within all other terminals, the all-pass filtering is then performed whereby the original factor z-ρ1 is replaced by the plurality of factors (z-ρ11) ... (z-ρ1j) ... (z-ρ1m). Similarly, the corresponding factor for the poles within this all-pass filter $(z-\rho_1^{-1*})$ as well consists of a plurality of factors $(z-\rho_{11}^{-1*}) \ldots (z-\rho_{1j}^{-1*}) \ldots (z-\rho_{1m}^{-1*})$. In the receiver filter Z the individual filter Z1 associated to terminal T1, in its turn consists of a filter bank, one for each of the individual zeroes ρ11 to ρ1m. This technique of course increases the complexity of both transmitter and receiver, especially when all user network terminals are assigned such a plurality of zeroes. On the other hand it improves the accuracy since in the receiver, each of these filters of the filter bank associated to a particular terminal is then followed by an averager, to average the outcome of all of them. The thus obtained average signal will have a higher signal to noise ratio than in case there was only one zero attributed to the terminal under consideration. For implementation reasons, typical values of m will not exceed 5. This will already improve the signal to noise ratio with a factor of at most 10 Log(5) dB.

This principle may be further used for compensating for frequency or phase shifts in the upstream channel. These frequency shifts can originate from channel impairments such as the Doppler effect, but may also be due to a not perfect matching of the local oscillator in modules 16 and 26 in the transmitter and receiver respectively. In case the upper boundary of this shift is known, the plurality of zeroes per terminal can be obtained by distributing them equally on part of the circumference of a circle in the z-plane, for instance a circle with a radius of 2. This part of the contour of this circle is called a phase region per terminal, and it is such that the phase shift between the two end points of this part is larger than or equal to the upper boundary of this frequency shift. In case this technique is applied to all terminals, two phase regions on this circle have to be separated by at least the maximum frequency shift occurring for all terminals. In case such an upper frequency bound is not known on forehand, such as is for instance the case for the Doppler effect, it first has to be measured.

To this purpose a characteristic parameter, for instance a maximum phase shift between transmitted and received signal of the communication channel between for instance terminal T1 and the central station CS is to be measured by a specific device dedicated to it. Such devices are known to a person skilled in the art and range from classical radar to more sophisticated devices using maximum likelihood methods based on the ambiguity function implemented with a DSP.

Once this channel parameter Cl such as the upper boundary of the Doppler shift is known for a particular communication channel between a particular network terminal and the central station, a set of or plurality of unique variable assigned to this particular network terminal are determined from this parameter. This set of variables, being zeroes for the other all-pass filters in the other network terminals, is then delivered to these network terminals as well as to the receiver of the central station. Of course several options are available for implementation of this device. The measurement of the parameter can be performed within the central station, within the terminals themselves, or even distributed. The derivation of the plurality of variables from it may as well occur within the central station, or within the terminals. In either case a communication of these values to the relevant devices which need them is to be foreseen.

A possible way of determining the plurality of these unique variables from the maximum Doppler shift measured consists of distributing them equally on part of the circumference of a circle in the z-plane, for instance a circle with a radius of 2, such that the phase shift between the two end points of this part is larger or equal than the measured Doppler phase shift. In the case that this technique of multiple variable determination from a measured Doppler shift is applied for all terminals, two phase regions on this circle also have to be separated by at least the maximum Doppler bound measured for all terminals.

In some embodiments of the device, this Doppler shift is measured initially, before the activation of the terminal. In a more performant variant of the device, this parameter is measured at predetermined instances, followed by a regular update and communication to the network terminals and the central station, of the values of these unique variables derived from it. In this way an adaptive multiple access method is obtained, tracking the Doppler shifts, and accordingly adapting the values of the zeroes of the all-pass filters for improving the performance.

It further is to be remarked that the measurement, determination of the associated plurality of variables, communication to the other terminals and the central station is to be synchronised in order to let the system function properly, especially in the case where updates of the variables have to be determined and provided. A person skilled in the art is however capable of realising such synchronisation, which will accordingly not be further described since it is not relevant to the invention itself.

While the principles of the invention have been described above in connection with specific apparatus, it is to be clearly understood that this description is made only by way of example and not as a limitation on the scope of the invention, as defined in the appended claims.

What is claimed is:

1. A multiple access method for use in a communications network wherein a central station (CS) is coupled to a plurality of network terminals (T1, ..., Ti, ..., Tn) in a point to multipoint way via the cascade connection of a common link (L) and respective individual network terminal links (L1, ..., Li, ..., Ln), said method includes a step of allocating a respective unique variable ($\rho 1, \ldots, \rho i, \ldots, \rho n$) to each respective network terminal of said plurality (T1, ..., Ti, ..., Tn), said method includes a first filtering operation on at least one oversampled symbol which is derived from upstream information to be transmitted by a terminal (T1;Ti) of said plurality to said central station (CS), said method includes a next step of filtering a received oversampled symbol stream at said central station (CS) for enabling said central station to discriminate therefrom said at least one oversampled symbol that was earlier transmitted by said network terminal (T1;Ti) to said central station (CS), characterized in that said first filtering operation comprises an all-pass filtering operation of said at least one oversampled symbol, said all-pass filtering operation having a z-transform transfer function ($\overline{c}_i(z)$) such that the zeroes thereof correspond to said respective unique variables assigned to all other network terminals, except the unique variable ($\rho 1; \rho i$) assigned to said network terminal (T1;Ti), said next step of filtering comprises performing the z-transform on said received oversampled symbol stream, and evaluating said z-transform at the unique variable ($\rho 1; \rho i$) assigned to said network terminal (T1;Ti).

2. A multiple access method according to claim 1 characterised in that at least one respective unique variable ($\rho 1$) assigned to at least one network terminal (T1) of said plurality comprises a plurality of unique variables ($\rho 11, \rho 11, \ldots, \rho 1j, \ldots \rho 1m$) assigned to said at least one network terminal (T1), the zero factor ($z-\rho 1$) of the z-transform of said first filtering operation performed in all other network terminals (T2, ..., Tn) and which has as zero said at least one respective unique variable of said at least one network terminal (T1), thereby comprises a plurality of zero factors, with said plurality of unique variables as zeroes, whereby at said central station said z-transform is evaluated at each unique variable of said plurality assigned to at least one network terminal (T1).

3. A multiple access method according to claim 2 characterised in that said method includes an additional step of measuring a channel parameter (C1) of the communication channel between said at least one network terminal (T1) and said central station (CS), and said plurality of unique variables ($\rho 11, \ldots, \rho 1j, \ldots \rho 1m$) assigned to said at least one network terminal (T1) is thereby derived from said channel parameter (D1).

4. A transmitter (TX1;TXi) for use in a network terminal (T1;Ti) of a plurality of network terminals (T1, ..., Ti, ..., Tn) which are coupled to a central station (CS) of a communications network in a multipoint to point way via the cascade connection of respective individual network terminal links (L1, ..., Li, ..., Ln) and a common link (L), each respective network terminal of said plurality (T1, ..., Ti, ..., Tn) being assigned a respective unique variable ($\rho 1, \ldots, \rho i, \ldots, \rho n$), said transmitter (TX1;TXi) includes a first filter (APF1;APFi) adapted to perform a first filtering operation on at least one oversampled symbol which is derived from upstream information to be transmitted by said network terminal (T1;Ti)

characterised in that said first filter (APF1;APFi) comprises an all-pass filter, of which the zeroes of the z-transform transfer function comprises all of said respective unique variables, except the unique variable ($\rho 1; \rho i$) assigned to said network terminal (T1;Ti).

5. A transmitter (TXi) according to claim 4 characterised in that at least one respective unique variable ($\rho 1$) assigned to at least one other network terminal (T1) comprises a plurality of unique variables ($\rho 11, \ldots, \rho 1j, \ldots \rho 1m$) assigned to said at least one other network terminal (T1), the zero factor of the z-transform of said all-pass filter (APFi) of said transmitter (TXi) which is related to said at least one respective unique variable ($\rho 1$) thereby comprises a plurality of zero factors with said plurality of unique variables as zeroes.

6. A receiver (RX) for use in a central station (CS) which is coupled in a point to multipoint way to a plurality of network terminals (T1, ..., Ti, ..., Tn) of a communications network via the cascade connection of a common link (L) and respective individual network terminal links (L1, ..., Li, ... Ln), each respective network terminal of said plurality (T1, ..., Ti, ..., Tn) being assigned a respective unique variable ($\rho 1, \ldots, \rho i, \ldots, \rho n$), said receiver (RX) includes second filter means (Z) adapted to perform a filter operation on a received oversampled symbol stream at said central station (CS) for enabling said central station to discriminate which part of said received oversampled symbol stream was previously transmitted by a network terminal (T1) of said plurality (T1, ..., Ti, ..., Tn), characterised in that said second filter means (Z) comprises a z-transform means, adapted to perform the z-transform on said received oversampled symbol stream, and to evaluate said z-transform in the ($\rho 1$) respective unique variable assigned to said network terminal (T1).

7. A receiver (RX) according to claim 6 characterised in that said respective unique variable ($\rho 1$) assigned to said network terminal (T1) comprises a plurality of unique variables ($\rho 11, \ldots, \rho 1j, \ldots \rho 1m$) assigned to said network terminal (T1), whereby said z-transform means (Z) is further adapted to evaluate said z-transform at each unique variable of said plurality assigned to said network terminal (T1).

8. A network terminal (Ti;T1) of a communications network wherein a central station (CS) is coupled to a plurality of network terminals (T1, ...,Ti, ...,Tn), including said network terminal, in a point to multipoint way from said central station to said plurality of network terminals via the cascade connection of a common link (L) and respective individual network terminal links (L1, ..., Li, ..., Ln), characterised in that said network terminal (Ti;T1) includes a transmitter (TXi;TX1) according to claim 4.

9. A central station (CS) of a communications network wherein said central station (CS) is coupled to a plurality of network terminals (T1, ,..., Ti, ..., Tn) in a point to multipoint way from said central station to said network terminals via the cascade connection of a common link (L) and respective individual network terminal links (L1, ... ,Li, ... ,Ln), characterised in that said central station (CS) includes a receiver (RX) according to claim 6.

10. A communications network including a central station (CS) which is coupled in a point-to-multipoint way to a plurality of network terminals (T1, ..., Ti, ..., Tn) included within said communications network via the cascade connection of a common link (L) and respective individual network terminal links (L1, ..., Li, ..., Ln), each respective network terminal of said plurality (T1, ..., Ti, ..., Tn) being assigned a respective unique variable ($\rho 1, \ldots, \rho i, \ldots, \rho n$), characterised in that said central station (CS) includes a receiver including filter means (Z) adapted to perform a filter operation on a received oversampled symbol stream at said central station (CS) for enabling said central station to discriminate which part of said received oversampled symbol stream was previously transmitted by a network terminal (T1) of said plurality (T1, ..., Ti, ..., Tn), wherein said second filter means (Z) comprises z-transform means, adapted to perform the z-transform on said received oversampled symbol stream, and to evaluate said z-transform in the ($\rho 1$) respective unique variable assigned to said network terminal (T1), and at least one network terminal (Ti) includes a transmitter (Txi) according to claim 4.

11. A communications network according to claim 10 characterised in that said receiver (RX) is characterized in that the respective unique variable ($\rho 1$) assigned to said network terminal (T1) comprises a plurality of unique variables ($\rho 11, \ldots, \rho 1j, \ldots, \rho 1m$) assigned to said network terminal (T1), and said z-transform means (Z) is further adapted to evaluate said z-transform at each unique variable of said plurality assigned to said network terminal (T1), and said transmitter (TXi) is further characterized in that said transmitter includes a first filter (APF1;APFi) adapted to perform a first filtering operation on at least one oversampled symbol which is derived from upstream information to be transmitted by said network terminal (T1;Ti), said first filter (APF1;APFi) comprising an all-pass filter, of which the zeroes of the z-transform transfer function comprise all of said respective unique variables, except the unique variable ($\rho 1; \rho i$) assigned to said network terminal (T1;Ti), at least one respective unique variable ($\rho 1$) being assigned to at least one other network terminal (T1) comprises a plurality of unique variables ($\rho 11, \ldots, \rho 1j, \ldots \rho 1m$) assigned to said at least one other network terminal (T1), and the zero factor of the z-transform of said all-pass filter (APFi) of said transmitter (TXi) which is related to said at least one respective unique variable ($\rho 1$), thereby comprises a plurality of zero factors with said plurality of unique variables as zeroes.

12. A communications network according to claim 11 characterised in that said communications network includes a device adapted to measure a channel parameter (C1) of the communications channel between at least one network terminal and said central station (CS), and to derive therefrom the plurality of unique variables assigned to said at least one network terminal.

13. A communications network according to claim 12 characterised in that said device is further adapted to deliver said plurality of unique variables assigned to said at least one network terminal to said receiver within said central station, and to said plurality of network terminals.

14. A communications network according to claim 13 characterised in that
    said device is further adapted to measure said at least one channel parameter at predetermined instances, to calculate therefrom updated values of said unique variables of said plurality, and to deliver said updated values to said receiver and to said plurality of network terminals.

* * * * *